(12) United States Patent
Nii et al.

(10) Patent No.: US 6,356,408 B1
(45) Date of Patent: Mar. 12, 2002

(54) MAGNETIC DISK APPARATUS, INCLUDING SPINDLE MOTOR HAVING AIR FLOW PASSAGE IN HUB FOR PRESSURE BALANCE

(75) Inventors: Katsutoshi Nii, Hitachi; Masaru Muranishi, Odawara; Kenji Tomida, Odawara; Kouki Uefune, Odawara; Shozo Saegusa; Yuuichi Yanagase, both of Ibaraki-ken, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/388,439

(22) Filed: Sep. 2, 1999

(30) Foreign Application Priority Data

Sep. 3, 1998 (JP) .......................................... 10-249293

(51) Int. Cl.[7] .......................... G11B 17/02; H02K 7/00; H02K 5/167
(52) U.S. Cl. .................... 360/98.07; 310/67 R; 310/90; 360/99.08
(58) Field of Search .......................... 360/99.08, 99.04, 360/98.07; 310/67 R, 90

(56) References Cited

U.S. PATENT DOCUMENTS

| | | | | |
|---|---|---|---|---|
| 5,012,359 A | * | 4/1991 | Kohno et al. | 360/98.07 X |
| 5,499,901 A | * | 3/1996 | Rockwood | 415/111 |
| 5,834,870 A | * | 11/1998 | Tokushima et al. | 310/90 |
| 5,859,745 A | * | 1/1999 | Elsing et al. | 360/98.07 X |
| 5,909,339 A | * | 6/1999 | Hong | 360/98.07 |

FOREIGN PATENT DOCUMENTS

| | | |
|---|---|---|
| JP | 5-336697 | 12/1993 |
| JP | 8-310830 | 11/1996 |

* cited by examiner

Primary Examiner—William Klimowicz
(74) Attorney, Agent, or Firm—Mattingly, Stanger & Malur, P.C.

(57) ABSTRACT

In a magnetic disk apparatus, the spindle motor is provided with a hole that penetrates the hub in the axial direction thereof. The hole permits fluid pressure on the outside and inside of the hub to become balanced, reducing the axial fluid force caused by the rotation of the spindle motor. The apparatus further includes a bearing provided with a groove for dynamic pressure generation and a magnetic lubrication fluid which, in combination with a permanent magnet, prevents oil leakage and scattering.

3 Claims, 4 Drawing Sheets

MAGNETIC DISK APPARATUS, INCLUDING SPINDLE MOTOR HAVING AIR FLOW PASSAGE IN HUB FOR PRESSURE BALANCE

BACKGROUND OF THE INVENTION

The present invention relates to a magnetic disk equipment using a dynamic pressure slide bearing.

Following remarkable spread of a personal computer, the magnetic disk equipment needs high recording density, large capacity, small size and high speed. The magnetic disk equipment, that is used for a personal computer, needs high speed and high precision of the rotation more and more. Ball bearings were used for the motor for a magnetic disk drive conventionally. Improvement of the manufacture precision and the lubrication, etc. in the ball bearings has raised rotary precision.

But the ball bearings have a limit to the improvement of manufacture precision. Rotary precision is deteriorated by wear of bearing surfaces. A transformation is easy to arise in the inside and outside ring in assembly of a motor, when the ball bearings of a small diameter are used for miniaturization of equipment. The limit of high recording density arises by the above reason. There is a motor that adopts a dynamic pressure slide bearing instead of ball bearings. This motor is disclosed in the Japanese patent Laid-open print No. 5-336697 official gazette. The motor that adopts a dynamic pressure slide bearing has the problem of the oil leakage from the bearing part and scattering of oil particles. The seal structure of a dynamic pressure slide bearing is disclosed to the Japanese patent Laid-open print No. 7-310830 official gazette.

SUMMERY OF THE INVENTION

The magnetic disk equipment for the personal computer of a desk top type and a notebook type is easy to handle it, and it is necessary to endure an impact when it falls from the top of a desk and during a portage. When magnetic disk equipment receives 500–1000 G impact, the intensity of the structure parts is deteriorated, and measured precision changes. In case of the magnetic disk equipment using dynamic pressure slide bearing equipment, the oil scattering from the bearing equipment occurs, and the function is sometimes harmed.

The structure that refers to the seal of bearing equipment is disclosed to the Japanese patent Laid-open print No. 8-310830 official gazette. This seal is used for the oil leakage measures of bearing equipment. But it is not considered against oil pollution of magnetic disk equipment. To increase rotary precision, a motor using a dynamic pressure bearing is disclosed to the Japanese patent Laid-open print No. 5-336697 official gazette. But when a spindle motor is installed in magnetic disk equipment and it is rotated, fluid power operates on a spindle motor in the axial direction. This fluid power is generated by the flow of the air between rotary parts such as the magnetic disk and the stillness part. At this time, because the flow of the air is not uniform, the fluid power fluctuates and sometimes harms the rotary precision of the axial direction.

Therefore, the fluid power of the axial direction that acts on the spindle motor for high recording density of the magnetic disk equipment must be reduced. A conventional spindle motor for the magnetic disk drive is positioned to the axial direction by force that attracts magnetically. But a conventional spindle motor does not consider the fluid power and the fluctuation of the fluid power that occur by the rotation of the magnetic desk.

It is an object of the invention to prevent pollution of the magnetic disk by the oil leakage and scattering of the oil particles from the bearing equipment.

Another object of the invention to provide the magnetic disk equipment with high reliability that does not generate the fluid power and the fluctuation of the fluid power that occurs by the rotation of the magnetic desk.

The present invention has a motor drive part and magnetic fluid bearing structure using the dynamic pressure slide bearing inside a hub on which the magnetic disk is mounted. A passage of the axial direction for air circulation is built in the hub. As a result, the fluid power and the fluctuation of the fluid power of the axial direction that acts on the spindle motor during the rotation is reduced, and the rotary precision of the axial direction is improved. To prevent the oil leakage from the bearing equipment, magnetic fluid is used as a lubrication fluid of the bearing. And magnetic fluid is magnetized with the permanent magnet arranged in the bearing equipment.

By preparing the spiral groove to generate the dynamic pressure in the opening of bearing equipment or in the face of hub that is opposed to this opening, the oil particle is prevented from rushing outside the bearing equipment. In case magnetic fluid leaks outside the bearing equipment by impact force that operates on magnetic disk equipment, the magnetic fluid leaked is recovered in the bearing equipment along the spiral groove by using the rotation of hub.

A hollow of a ring-form is provided in the hub in the neighborhood of the connection of the hub and the rotary axis. In case magnetic fluid leaks outside the bearing equipment by impact force that operates on magnetic disk equipment, the magnetic fluid leaked is held in this hollow. As a result magnetic fluid is prevented from scattering.

The passage for the air circulation that penetrates the axial direction was built in the hub on which the magnetic disk is mounted. As a result the fluid power of the axial direction that acts on the hub and the fluctuation of this fluid power can be suppressed. Because the rotary precision of the axial direction can be raised, the recording density of magnetic disk equipment improves. The groove for dynamic pressure generation was prepared in the opening of bearing equipment. The hollow of a ring-form was provided in the press fitting part of the hub and the axis. As a result, leakage of magnetic fluid that was enclosed in the bearing equipment and scattering of the oil particles can be prevented during the rotation. Leakage of magnetic fluid that was enclosed in the bearing equipment and scattering of the oil particle can be prevented even if impact power operates on magnetic disk equipment. Pollution of the magnetic disk is prevented, the precise spin of the magnetic disk can be maintained, and the life of the magnetic disk becomes long. By the above, magnetic disk equipment with a high recording density and with high reliability can be provided.

DESCRIPTION OF THE PREFERRED EMBODIMENTS

As follows, the embodiment of the present invention is explained.

Figure 1:
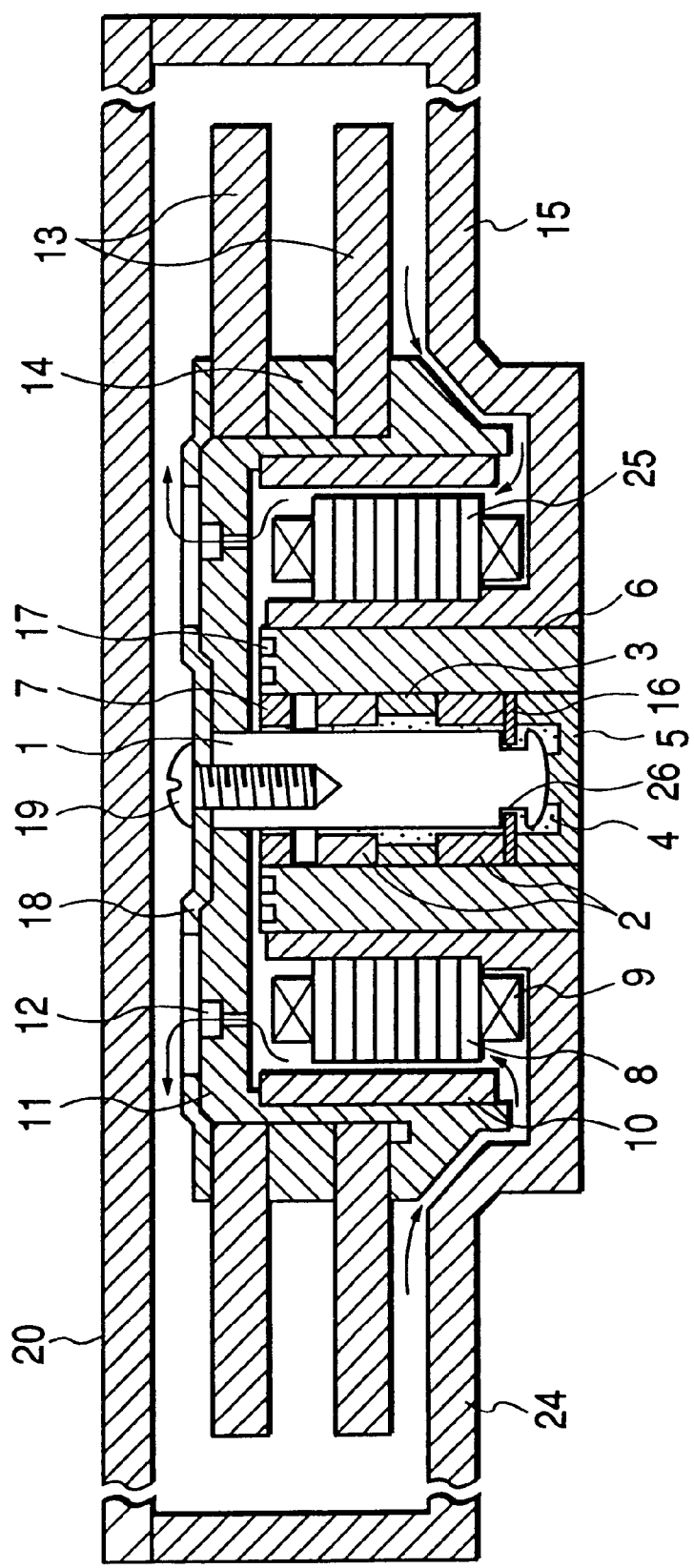
FIG. 1 is the part vertical sectional view of the magnetic disk equipment of the present invention.

In FIG. 1, case 24 of magnetic disk equipment is comprised of casing 15 and casing cover 20. Part of case 24 is omitted in this figure. The transducer is arranged in the surface of the magnetic disk for recording information in the magnetic disk and for reproducing information recorded in the magnetic disk. The transducer is positioned to a truck where the information is recorded or reproduced in. In FIG. 1, a positioning device to position the transducer is omitted. In this case 24, motor (spindle motor) 25 for the drive of magnetic disk 13 is arranged. Motor 25 is composed of multipolar permanent magnet 10 provided in the inside circuit of hub 11 of the cup shape, armature winding 9 for magnetic field generation provided on the casing 15 side and armature iron core 8. That is, armature iron core 8 is adjusted to the projection part of casing 15.

Seal ring 7, dynamic pressure radial bearing 2, permanent magnet 3 provided between dynamic pressure bearings, stopper ring 16 and thrust bearing 5 are arranged in the bearing equipment along rotary axis 1 from the side (the upper side of the figure) of the opening of bearing case 6. Magnetic fluid 4 for lubrication is filled between rotary axis 1 and radial bearing 2, between rotary axis 1 and thrust bearing 5.

Figure 4:
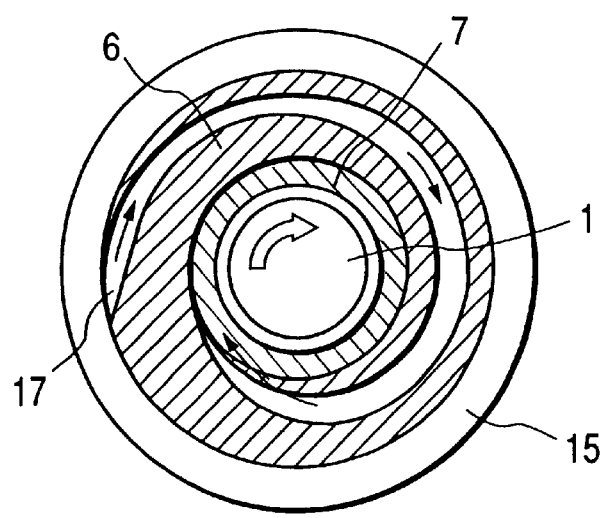
FIG. 4 shows the groove shape of the upper end face of the bearing case for the dynamic pressure occurrence of the bearing equipment opening of the present invention.
Figure 5:
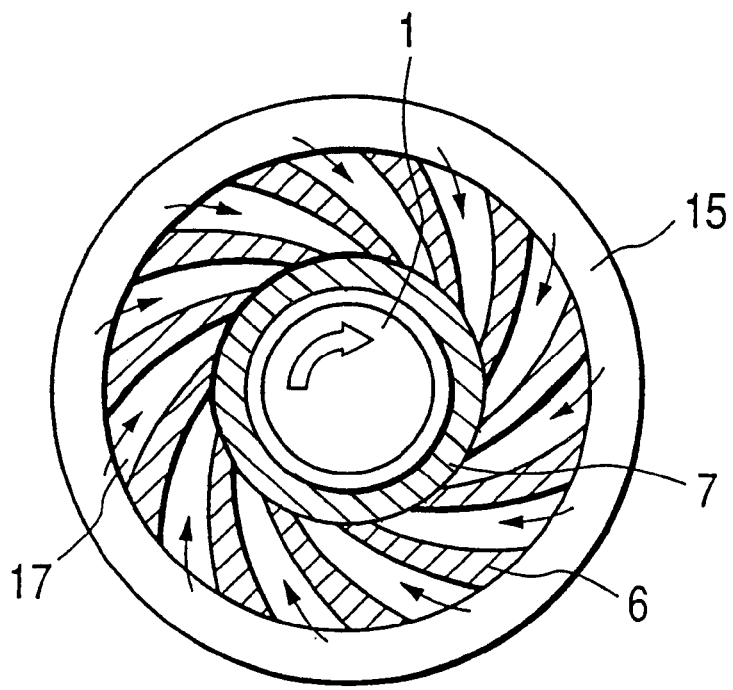
FIG. 5 shows the groove shape of the upper end face of the bearing case for the dynamic pressure occurrence of the bearing equipment opening of the present invention.

Spiral groove 17 of the shape that is shown in FIG. 4 or FIG. 5 is prepared in the opening end part of this bearing case 6. In case magnetic fluid 4 leaks in the space between the end of bearing case 6 and the face of hub 11, this spiral groove 17 returns the leaked magnetic fluid inside seal ring 7 by using the negative pressure or pumping that occurs by the turn of rotary axis 1. As a result the scattering to the side of motor 25 of magnetic fluid 4 can be prevented.

In the inside face of seal ring 7, spiral groove 21 is prepared. Groove 21 prepared in the seal ring 7 returns magnetic fluid to the bearing side.

Rotary axis 1 press fitted to the hub 11 is supported to be able to rotate by dynamic pressure radial bearing 2 provided at both ends of permanent magnet 3. To hold magnetic fluid 4 in bearing case 6, permanent magnet 3 is arranged. The load of the axial direction is supported by receiving the sphere part of the tip of rotary axis 1 on thrust bearing 5. A magnetic disk Clamp 18 is fixed to the rotary axis 1 and hub 11 by bolt 19. Stopper ring 16 held between thrust bearing 5 and radial bearing 2 is fitted in groove 26 prepared in rotary axis 1. As a result rotary axis 1 does not come out to the axial direction. Passage 12 (hole) that connects the motor 25 side and casing cover 20 side for the air circulation penetrates the hub 11.

Several magnetic disks 13 install to the outer periphery of the hub 11 to keep the specified space by spacer 14. The top of magnetic disk 13 is fixed with magnetic disk clamp 18.

Figure 7:
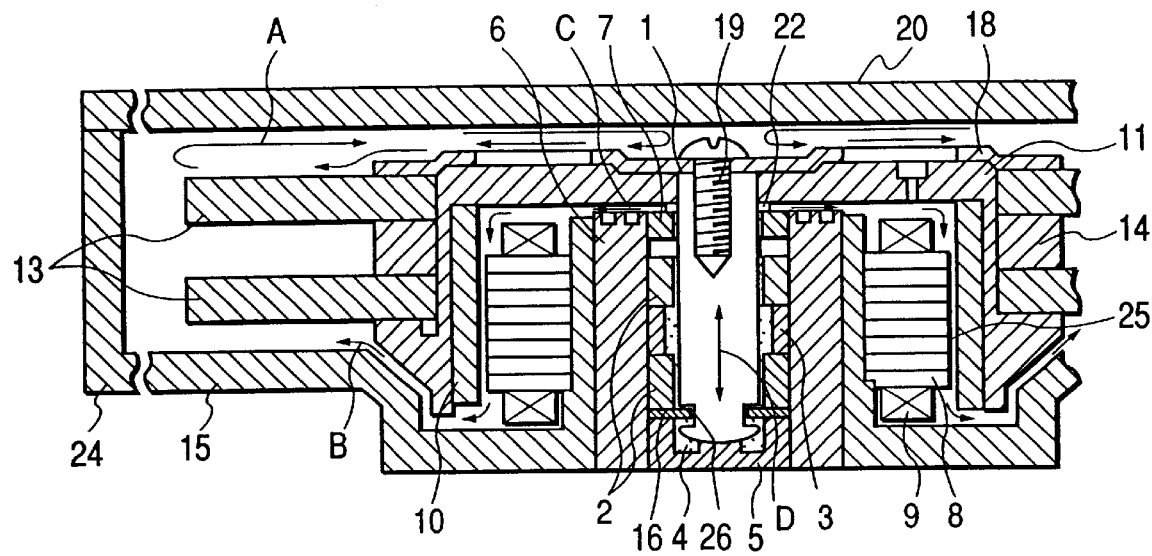
FIG. 7 is the part vertical sectional view of a magnetic disk equipment not having a hole in the hub with respect to FIG. 1.

The sectional view of the magnetic disk equipment is shown in FIG. 7.

As shown in FIG. 7, the space between casing cover 20 and hub 11 is small, and the space is about 1 mm. The air that is shown to arrow A flows in a conventional structure that does not prepare hole 12 in the hub 11 when magnetic disk 13 spins. Therefore, the pressure difference arises between the side of the outer periphery of the magnetic disk 13 and the center of the hub 11. Then, the power that attracts the hub 11 to the casing cover 20 side occurs. Inside the hub 11 in which motor 25 is positioned, the air flows from arrow C to the direction of arrow B. At this time, the pressure difference arises between bearing case 6 and permanent magnet 10. But the force that attracts the hub 11 to the motor 25 side is small than the casing cover 20 side by difference between the differences of the diameter. Therefore, the hub 11 is attracted to the casing cover 20 side.

Disorder of the air on the casing cover 20 side arises by magnetic disk 13 and magnetic disk clamp 18. It acts as a fluctuation load of the axial direction. This fluctuation load is shown to arrow D. On the other hand, magnet thrust power is given to the hub 11 by force (about 100 GRF) that operates between permanent magnet 10 and armature iron core 8. But the bearing load that acts on the thrust bearing 5 becomes smaller than the thrust load at the time of standing still because the force that works by the pressure difference on the casing cover 20 side becomes the reverse direction.

The magnetic attraction force is at most 100 GRF. Therefore, when the load of the axial direction that occurs by the spin of this magnetic disk 13 approaches the magnetic attraction force, the vibration displacement of the axial direction by disorder of the air on the casing cover 20 side enlarges. The vibration displacement by this disorder of the air is the asynchronous vibration that does not relate to the number of revolutions. This asynchronous vibration cannot be controlled by the control system of magnetic disk equipment. Therefore, when the asynchronous vibration is large, the recording density of magnetic disk 13 cannot be raised.

In this embodiment, the hole 12 is prepared in the hub 11 to maintain the magnetic attraction force that operates between permanent magnet 10 and armature iron core 8, and to reduce the fluctuation load by disorder of the air. As a result the axial load that acts on the hub 11 is made to balance by making the pressure on the motor 25 side balance with the pressure on the casing cover 20 side. When the holes 12 are prepared in the hub 11, because the flow of the air becomes the arrow direction of FIG. 1, there is also an Advantage in cooling of the motor 25 side. By raising cooling of the motor side, the bearing equipment can be cooled. Therefore, evaporation of magnetic fluid enclosed in the bearing equipment can be suppressed. As a result the life of magnetic disk equipment becomes long, and reliability of magnetic disk equipment improves.

In this embodiment, passage 12 (hole) for the air circulation is built, and the flow of the air that is shown in the arrow of FIG. 1 is made. Even if passage 12 (hole) for the air circulation is applied to magnetic disk equipment on which the spindle motor using a conventional roller bearings is mounted, the fluctuation load by disorder of the air can be reduced. Therefore, the Function Advantage that is similar to the case of the slide bearing of FIG. 1 is obtained.

With the magnetic disk equipment of this embodiment. Using dynamic pressure radial bearing 2 that has three circular arcs or herringbone type dynamic pressure bearing 2, the hub 11 can maintain the high precision rotation. But as it is mentioned above, the flow of the air arises in the arrow direction shown in FIG. 1 on the motor 25 side. When the oil particle occurs by evaporation of magnetic fluid 4 enclosed in bearing equipment, the oil particle comes out to the magnetic disk 13 side along the flow of the air, and magnetic disk 13 is polluted.

Figure 2:
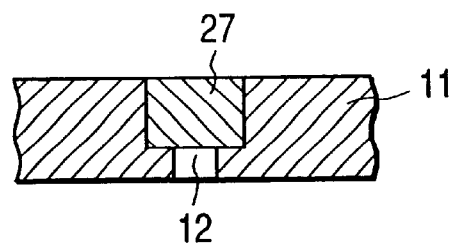
FIG. 2 is the part vertical sectional view of the filter structure of the passage formed to the hub for the air circulation of the present invention.
Figure 3:
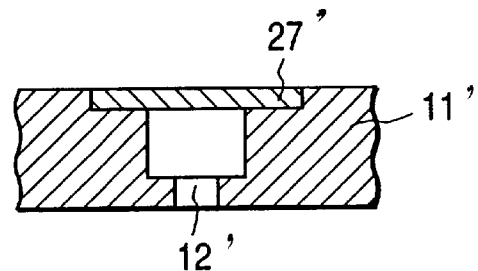
FIG. 3 is the part vertical sectional view of the filter structure of the passage formed to the hub for the air circulation of the present invention.

As shown in FIG. 2, this pollution can be prevented by using the filter 27,made of fluorine resin or coated fluorine resin on fiber, to cover hole 12. While these filters 27 pass the air, liquid is not passed. Therefore, these filters 27 have the advantage that fits the purpose of the present invention. Filter 27' can be made ring shaped against hole 12' shown in FIG. 3. In this embodiment, by building passage 12' for the air circulation that penetrates the axial direction in the hub 11', the flow of the air arises in the arrow direction shown in FIG. 1. Because filter 27 shields the dust of bearing equipment and the motor part, the damage of magnetic disk 13 by the dust can be prevented.

In the slide bearing equipment, the occurrence of the oil particle by evaporation of the lubricant enclosed in the bearing equipment is not avoided. Therefore, long-term use decreases magnetic fluid 4 for lubrication enclosed in bearing equipment. When magnetic fluid 4 decreases, the dynamic pressure function of the bearing is harmed. When the dynamic pressure Function of the bearing is harmed, the vibration occurs by the oil shortage, and rotary precision deteriorates.

Figure 6:
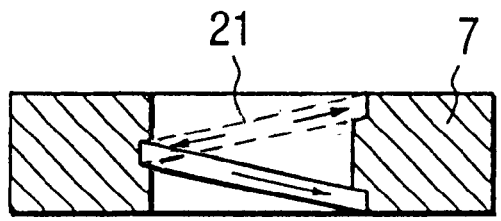
FIG. 6 is the vertical sectional view of the seal ring and shows the spiral groove of the inside circuit (on the face that is opposed to the rotary axis of the seal ring) of the present invention.

As shown in FIG. 4, FIG. 5 and FIG. 6, to prevent magnetic fluid 4 from decreasing by scattering, in this embodiment, spiral grooves 17 and 21 for dynamic pressure generation are prepared in the end of the bearing case 6 and in the inside circuit of the seal ring 7.

In case there is not spiral groove 17 for dynamic pressure generation in the end of bearing case 6, the rotation of the hub 11 generates the turning flow of the air inside the hub 11 in which motor 25 was arranged. And, as shown in FIG. 7, the air flows from arrow C to the direction of arrow B, and the pressure difference arises between axis 1 and permanent magnet 10. Therefore, the air of the end part of bearing case 6 becomes the turning flow. The oil particle 22 that evaporated in bearing case 6 mixes in this turning flow and scatters on the motor 25 side.

In this embodiment, spiral groove 17 for dynamic pressure generation is prepared in the end of bearing case 6 to converge on the direction that is the same as the rotary direction of axis 1. The oil particle is returned to the seal ring 7 side by making the turning flow along spiral groove 17 (arrow direction of FIG. 4 and FIG. 5). As a result the oil particle that occurs because of evaporation, etc. in bearing case 6 does not scatter on the motor 25 side.

The space between the end of bearing case 6 and the hub 11 is made small so that an occurrence of the dynamic pressure becomes easy. For example, this space is 0.1 MM–0.3 MM. The space between the inside circuit of seal ring 7 and axis 1 is made $10 \mu M$–$30 \mu M$, and the turning flow of the air of the arrow direction of the figure is generated in parts of the spiral groove 21. As a result the oil particle and magnetic fluid 4 that adhered to seal ring 7 is returned to radial bearing 2.

Groove 17 for dynamic pressure generation can be prepared in the face of the hub 11 that is opposed to the end of bearing case 6 instead of preparing in the end of bearing case 6. While the hub 11 rotated, the flow of the air was conducted to the radial bearing 2 side in the opening of the bearing equipment, and in the part of motor 25 the air flows in the arrow direction shown in FIG. 1. As a result the oil particle that comes out from the bearing equipment is prevented from scattering.

In this embodiment, when the impact operates on the axial direction, axis 1 is prevented from getting out by stopper ring 16. But magnetic fluid 4 enclosed in bearing equipment overcomes holding power by magnetic attraction force of permanent magnet 3 and sometimes comes out to the end part of bearing case 6. The space between seal ring 7 and axis 1 and the space between bearing case 6 and the hub 11 is made small like above. In case magnetic fluid 4 comes out, it also can be stopped to the neighborhood of the end part of seal ring 7.

Figure 8:
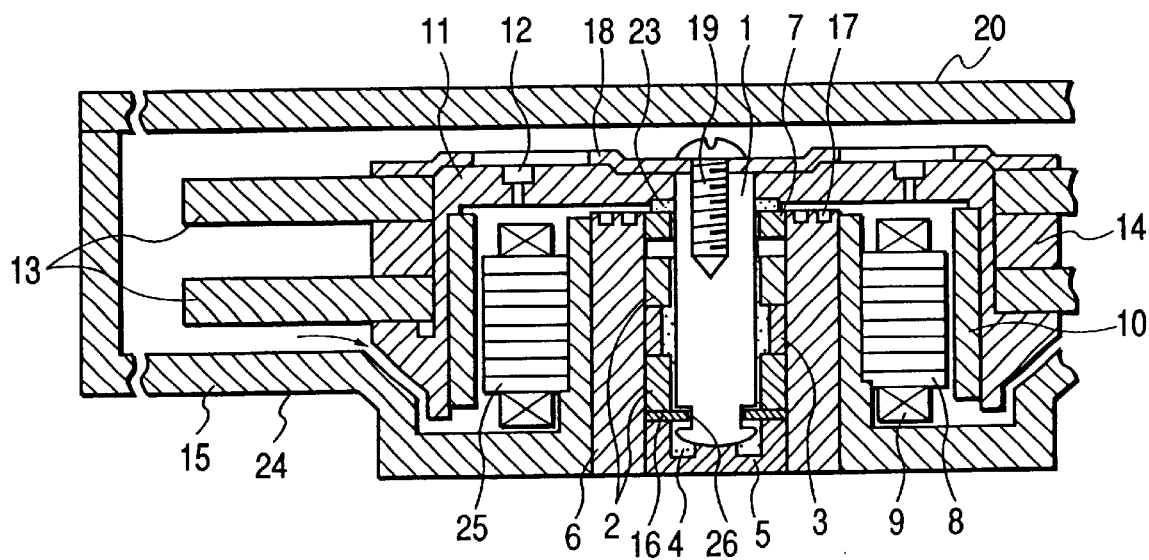
FIG. 8 is the part vertical sectional view of the magnetic disk equipment of other embodiment of the present invention.

In the embodiment shown in FIG. 8, hollow 23 of the ring-form in which magnetic fluid 4 is held is provided in the press fitting part of the hub 11 and axis 1. In case the hollow 23 is not provided, when the hub 11 rotates, the centrifugal force scatters magnetic fluid 4. In this embodiment, magnetic fluid 4 that comes out by impact force of the axial direction is held in hollow 23. When the hub 11 rotates, the oil particle is prevented from scattering, and magnetic fluid 4 is recovered into the bearing equipment by the function of the spiral groove prepared in bearing case 6 and seal ring 7. As a result pollution of magnetic disk 13 by the oil particle can be prevented.

What is claimed is:

1. A spindle motor used in an information storage apparatus at least to reproduce information from a rotating disk storage, comprising:

a member which forms a part of a case on which the spindle motor is installed;

a rotary axis;

a bearing device which supports said rotary axis to be able to rotate against said member;

a cup-shaped hub on which to install the disk storage, having a motor to rotate the disk storage and said bearing device inside thereof, and a passage for air circulation, which connects the inside of said hub to outside thereof;

wherein said bearing device comprises a seal ring, a first radial bearing, a permanent magnet, a second radial bearing and a thrust bearing arranged along said rotary axis from a side of an opening;

said first and second radial bearings are dynamic pressure sliding bearings;

magnetic fluid is used as a lubricant for said first and second radial bearings;

said disk storage is a plurality of magnetic disks stacked on said hub in the direction of the axis of rotation;

a first spiral groove is formed either in the opening of said bearing device or on a surface of said hub opposite to said opening;

a second spiral groove is formed on an inner surface of a seal ring provided at a side of said opening;

said passage is provided with said hub as a penetration hole in the axial direction that connects the inside and the outside of the hub; and a filter made of a fluorine resin or comprising fibers coated with a fluorocarbon resin is positioned in said penetration hole;

wherein said second spiral groove forces the fluid leaked from said bearing device back into said bearing device.

2. A spindle motor as claimed in claim 1, wherein an outside opening of said passage is arranged at a portion of said hub which is situated on an opposite side of said member with respect to said disk storage.

3. An information storage apparatus at least to reproduce information from a disk rotated by a spindle motor as claimed in claim 1, wherein a cover is provided to cover said disk storage, and an outside opening of said passage is provided so as to connect the inside of the hub with a space formed by said disk storage and said cover.

* * * * *